US008220301B2

(12) United States Patent
Ghiran et al.

(10) Patent No.: US 8,220,301 B2
(45) Date of Patent: Jul. 17, 2012

(54) TOOL FOR AND METHOD OF FORMING AT TAPPED HOLE IN A SINGLE PASS

(75) Inventors: Mike M. Ghiran, Lake Orion, MI (US); Spyros P. Mellas, Waterford, MI (US); David H. Shea, Lake Orion, MI (US); Thomas W. McClure, Brookfield, WI (US); Darrell W Rebman, Kimball Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 988 days.

(21) Appl. No.: 12/172,242

(22) Filed: Jul. 13, 2008

(65) Prior Publication Data

US 2010/0008737 A1 Jan. 14, 2010

(51) Int. Cl.
*B21D 28/28* (2006.01)
*B21D 31/02* (2006.01)

(52) U.S. Cl. ................ 72/55; 72/71; 72/325; 72/370.27

(58) Field of Classification Search ................ 72/55, 71, 72/325–327, 329, 370.27; 83/53, 54
See application file for complete search history.

(56) References Cited

U.S. PATENT DOCUMENTS 4,132,097 A * 1/1979 Ames ................................ 72/71
6,931,901 B2 8/2005 Ghiran
2008/0168817 A1* 7/2008 Ghiran et al. ..................... 72/55

* cited by examiner

*Primary Examiner* — Debra Sullivan

(57) ABSTRACT

A tool adapted to form and method of forming a tapped hole within a workpiece in a single pass, includes a piercing section operable to punch a pilot hole in and produce a slug attached to the workpiece, and a tapping section operable to form a female thread along the periphery of the hole, and more preferably, an extruding section operable to push workpiece material away from the exterior surface defined thereby, an expanding section operable to expand the diameter of the hole, a sealing section operable to seal the hole during a hydroforming process, and a burnishing section operable to further expand and treat the periphery of the hole prior to tapping.

17 Claims, 7 Drawing Sheets

10
54
46
42
38
44
36
32
30
34
28
14
16
24
12a
12
12b 54
52
18
20
26
22

32
20
30
28

38
12
18
16
22

TOOL FOR AND METHOD OF FORMING AT TAPPED HOLE IN A SINGLE PASS

BACKGROUND OF THE INVENTION

1. Field of the Invention

The present invention relates to tap tools, methods of forming threaded holes in sheet metal and workpieces, and in-die hole piercing/tapping processes, and more particularly, to a tool for and method of piercing, extruding, sealing, burnishing and forming a rolled thread in a single pass, wherein the tool and method are adapted for particular use with a hydroforming p rocess.

2. Discussion of Prior Art

Machine screws and threaded bolts have long been used to secure parts of an assembly. To enable this method of joining, tapping tools and processes have likewise been developed to cut or roll female threaded holes within a workpiece or part. In doing so, it is typical for a pilot hole to be initially formed in the workpiece, wherein the hole presents a diameter smaller than that of the intended bolt. A thread having the same pitch with that of the bolt is then perpendicularly rolled into the periphery of the pilot hole. More preferably, a shoulder is provided along the periphery so as to promote perpendicular engagement between the male bolt and female hole. Thus, at least a two-step tapping process is widely appreciated, wherein one set-up for piercing is required to be changed-out by another for tapping. Concernedly, however, this adds costs associated with increased production time, complexity, and repair/replacement.

Hydroforming has concurrently become an increasingly popular method of forming finished parts prior to tapping. This method of part production involves securing a workpiece within a die cavity, engaging the workpiece with pressurized fluid, and expanding the workpiece, so as to cause it to conform to the die cavity.

Accordingly, there is a need in the art for an improved tool or method of tapping a workpiece in a single pass, and more preferably, one that is compatible with and utilizes the advantages of the hydroforming process.

BRIEF SUMMARY OF THE INVENTION

Responsive to these and other concerns the present invention presents a tool for and method of forming a tapped hole in a single pass. As such, the invention presents a single-step process that is able to supplant conventional multi-step piercing, extrusion and tapping processes, thereby reducing production time and associated costs.

The invention is further useful for tapping a hole during a hydroforming process. More specifically, the inventive tool is preferably configured to seal the hole and prevent leaks during the hydroforming process. This advantageously utilizes the translation of the workpiece under fluid pressure to effect the relative translation of the workpiece and tool.

The invention is further useful for forming a tapped hole without producing a loose slug. More specifically, in this regard, the inventive tool is preferably configured so as not to detach the punched portion of the workpiece from the remainder.

Thus, a first aspect of the present invention broadly concerns a tool adapted to form a tapped hole within a workpiece in a single pass. The workpiece presents a hardness, thickness, and exterior surface. The tool comprises an elongated member presenting a distal end and a longitudinal length greater than the thickness. The member further presents a piercing section, wherein the piercing section is adjacent the distal end, defines a cutting edge, and is configured to cut a slug from the remainder of the workpiece during the pass, so as to produce a pilot hole therein. The hole presents an initial diameter and defines a periphery. Lastly, a tapping section is spaced from the distal end and configured to form a thread along the periphery of the hole, also during the pass.

A second aspect of the present invention concerns a method of producing the tapped hole within the workpiece in a single pass. The method comprises the initial step of engaging the surface with a piercing tool defining a continuous cutting edge and translating the edge towards the workpiece a distance greater than the thickness. As a result, a slug is cut from the remainder of and a pilot hole is formed within the workpiece to initiate the pass. Next, the periphery of the hole is engaged with a tapping tool and the tool is translated, while rotating in a first direction, a distance greater than the thickness, so as to form a thread along the periphery of the hole, during the pass. The tapping tool is disengaged from the hole by reversibly translating a distance greater than the tool length, while rotating in a direction opposite the first, during the pass. The tool is then linearly and rotationally translated to its start position for another cycle.

Other aspects and advantages of the present invention, including further engaging and disengaging the hole with expanding, extruding, sealing, and burnishing sections will be apparent from the following detailed description of the preferred embodiment(s) and the accompanying drawing figures.

BRIEF DESCRIPTION OF THE SEVERAL VIEWS OF THE DRAWING

Preferred embodiments of the invention are described in detail below with reference to the attached drawing figures, wherein.

Figure 2:
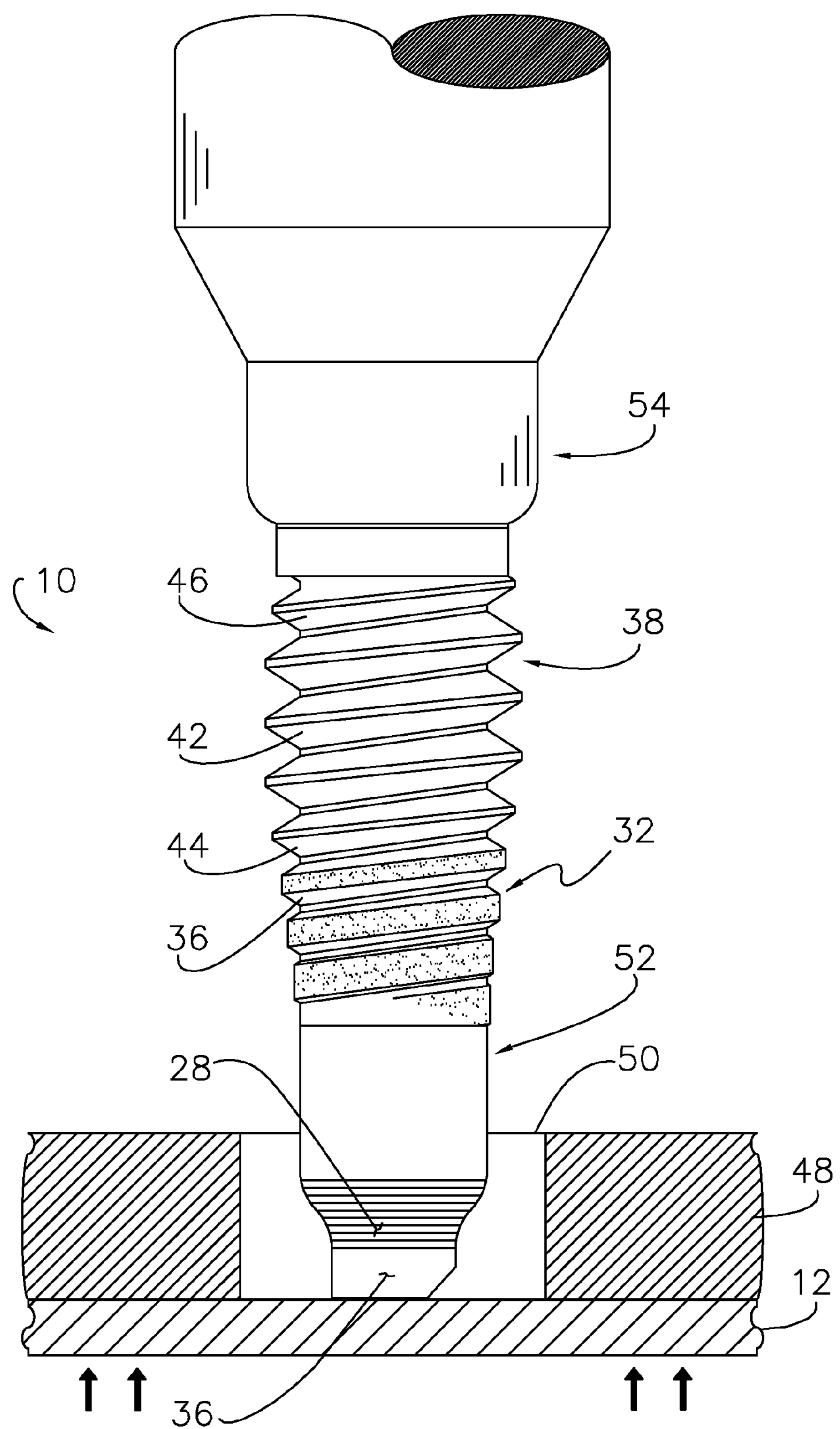
FIG. 2 is an elevational view of a tool in a pre-tap position relative to a workpiece and die prior to a hydroforming process, particularly illustrating a tool further having a sealing section in addition to the sections shown in FIG. 1, in accordance with a preferred embodiment of the present invention.
Figure 4:
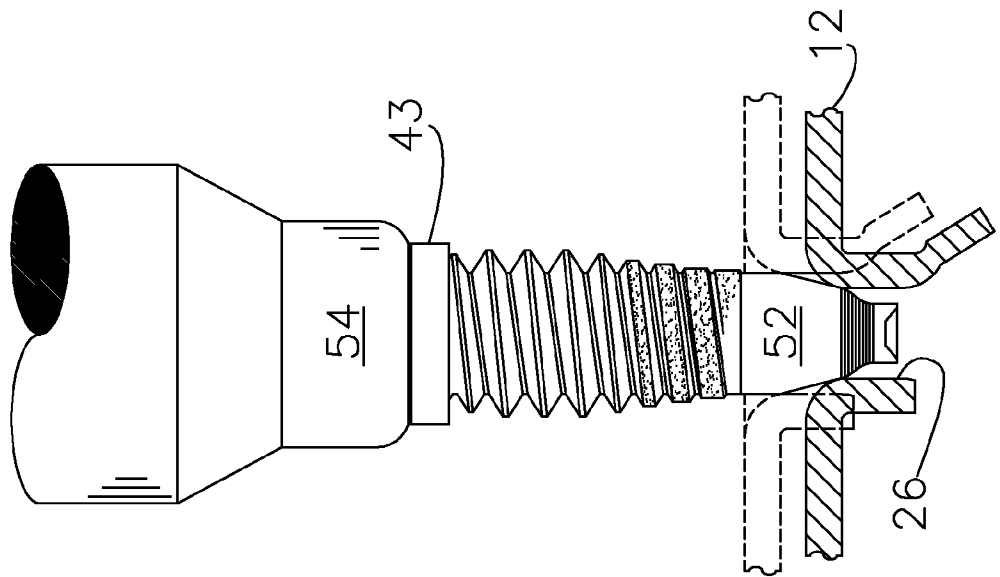
Figure 3:
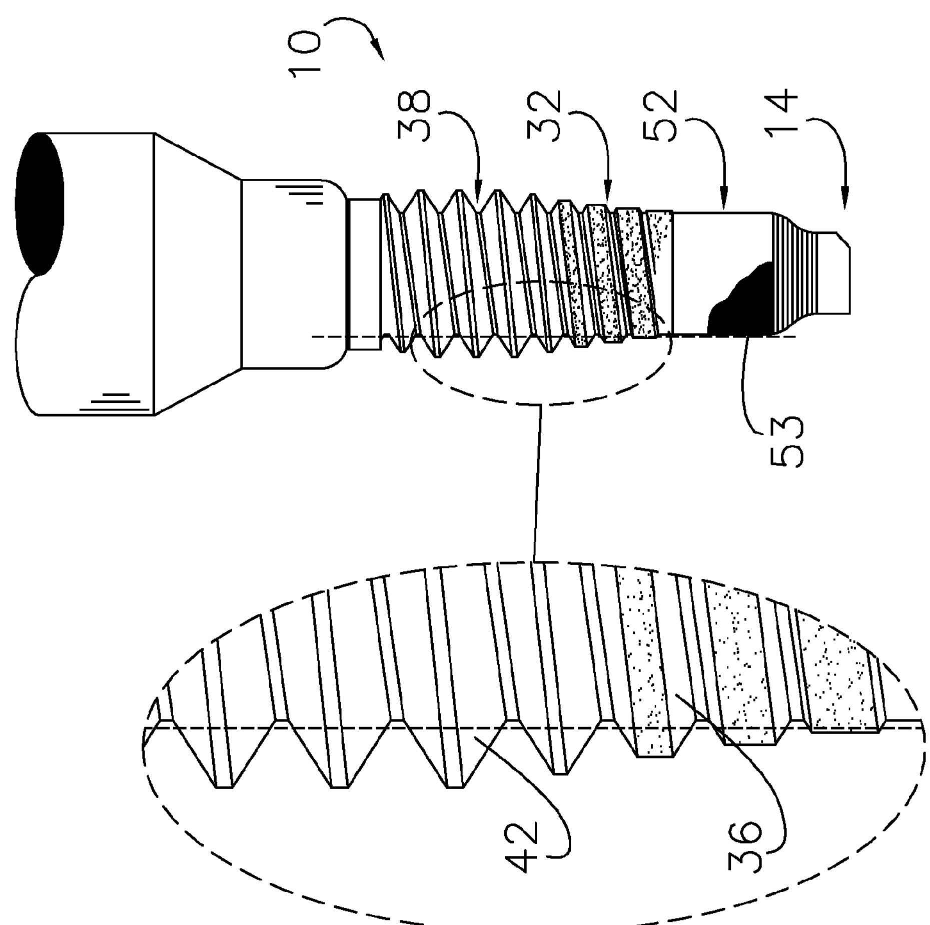
Figure 5:
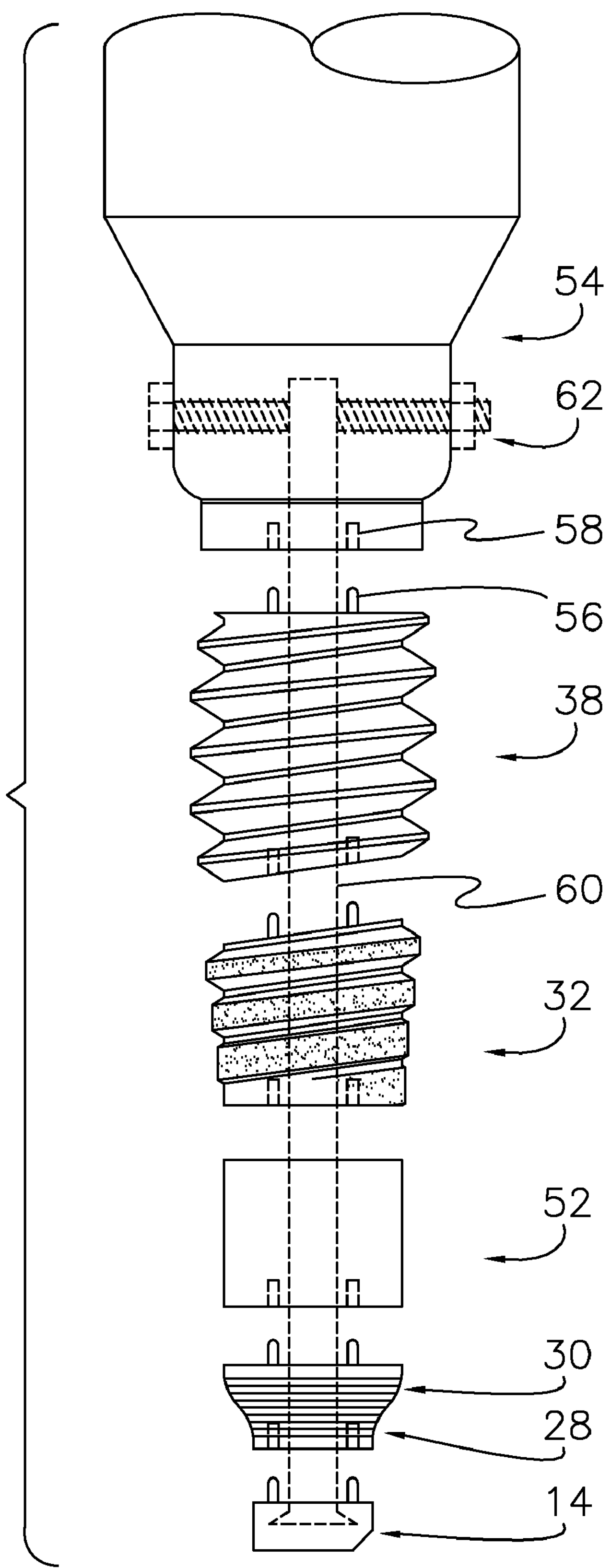

FIG. **2*a* is an elevational view of the tool and workpiece shown in FIG. 2**, wherein the piercing section engages the workpiece, to initiate a pass;

FIG. **2*b* is an elevational view of the tool and workpiece shown in FIG. 2**, wherein the extruding and expanding sections engage the workpiece during the pass;

FIG. **2*c* is an elevational view of the tool and workpiece shown in FIG. 2**, wherein the sealing section initially engages the workpiece during the pass;

FIG. **2*d* is an elevational view of the tool and workpiece shown in FIG. 2**, wherein the sealing section further engages the workpiece during the pass;

FIG. **2*e* is an elevational view of the tool and workpiece shown in FIG. 2**, wherein the burnishing section engages the workpiece during the pass;

FIG. **2*f* is an elevational view of the tool and workpiece shown in FIG. 2**, wherein the tapping section engages the workpiece during the pass;

FIG. **2*g* is an elevational view of the tool and workpiece shown in FIG. 2**, wherein the tool is disengaged from the tapped workpiece to complete the pass;

FIG. 3 is an elevational view of the tool shown in FIG. 2 and an enlarged inset of a preferred embodiment of the threads of the burnishing and tapping sections;

FIG. 4 is a partial elevation view of a tap tool for use in the present invention, particularly illustrating a sealing section having tapered walls, in accordance with a preferred embodiment of the invention; and FIG. 5 is an elevation view of an assembled tool comprising a plurality of subparts, and secured by a locking key and fastener, in accordance with a preferred embodiment of the invention.

DETAILED DESCRIPTION OF THE INVENTION

Referring collectively to FIGS. 1-5, the present invention concerns an improved tap tool 10 and method of piercing and tapping a workpiece 12 in a single pass. The tool 10 accomplishes multi-functions in a single pass by presenting a plurality of sections or elements, each configured to engage and treat the workpiece 12. In a preferred embodiment, the inventive tool 10 is further adapted for use during a hydroforming process that causes the lateral translation of the workpiece 12. The tool 10 is described and illustrated herein with respect to a singular planar workpiece 12, such as sheet metal; however, it is certainly within the ambit of the invention to utilize the tool 10 to tap a multi-layered stack-up. The tool 10 may be modified accordingly, for example, by lengthening at least a portion thereof. As used herein, the term "pass" shall mean a complete tapping cycle, commencing with securing the tool 10 in a pre-tap position relative to the workpiece 12 and terminating with the complete disengagement of the tool 10 from the workpiece 12 after the hole has been formed. The term "element" encompasses disjoined structures individually positioned and operable to perform a particular step of the inventive method described herein.

Figure 1:
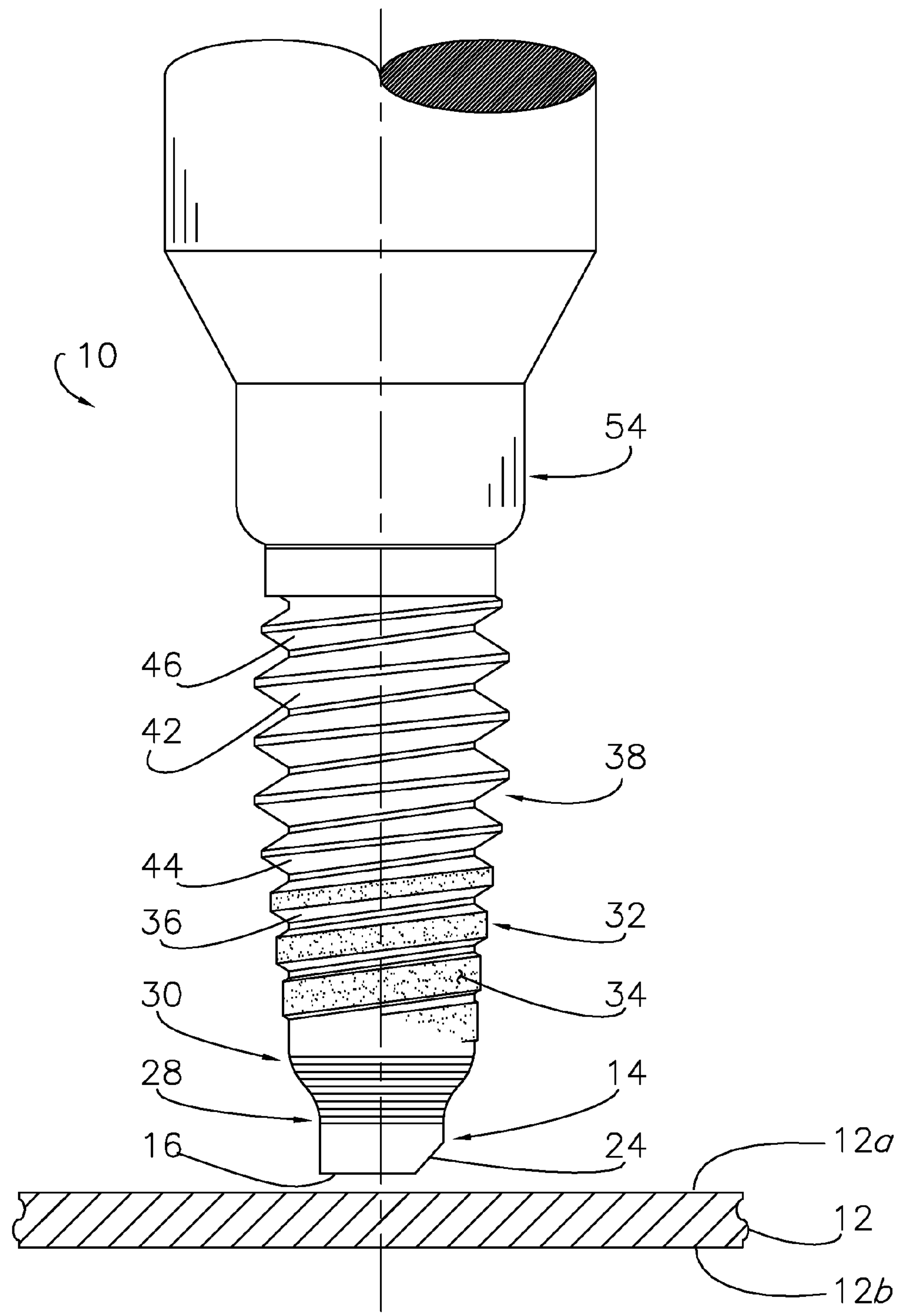
FIG. 1 is an elevational view of a tool in a pre-tap position relative to a workpiece, particularly illustrating a tool having piercing, extruding, expanding, burnishing, and tapping sections, in accordance with a preferred embodiment of the present invention.

The workpiece 12 presents a predetermined hardness and thickness, and defines an exterior engaging surface 12*a* (FIG. 1). More preferably, the surface 12*a* is generally flat so as to be perpendicularly engaged by the tool 10. Workpiece materials suitable for use with the present invention, include aluminum, aluminum alloy, carbon steel and steel alloys. The tool 10 and workpiece 12 are cooperatively configured such that the tool 10 presents a hardness value greater than that of the workpiece 12, where necessary. Also, the tool 10 and workpiece 12 are cooperatively configured such that the tool 10 presents sufficient longitudinal lengths in comparison to the thickness to effect the intended function.

As shown in the illustrated embodiment, the tool 10 presents an elongated member defining opposite distal and connecting ends, as well as a longitudinal central axis (FIG. 1). The tool 10 includes a piercing section 14 adjacent the distal end that defines a cutting edge 16. More preferably, the edge 16 is continuous and most preferably, presents a circular configuration. The edge 16 presents a hardness value greater than that of the workpiece 12, so as to cut the workpiece 12. For example, where the workpiece 12 is formed of an aluminum blank, the piercing section 14 may be formed of steel.

Figures 2A, 2B, 2C:
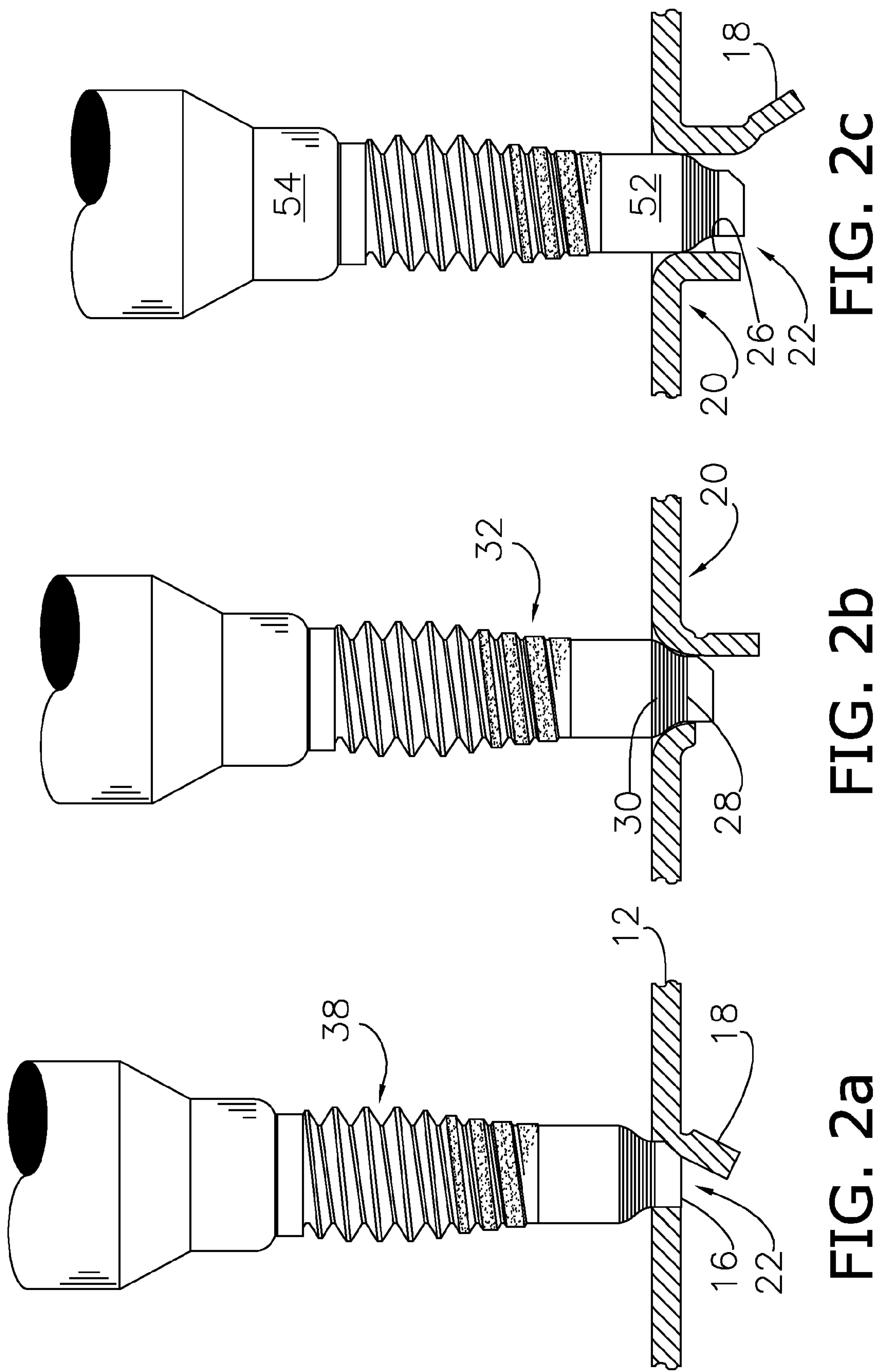

The edge 16 preferably defines a blunt nose that is flat or slightly convex, and is operable, when sufficient hydraulic pressure is applied to the tool 10 to punch a slug 18 from the remainder 20 of the workpiece 12 (FIG. 2*a-b*). By engaging the tool 10 with the workpiece 12 and supplying sufficient pressure along the edge 16 (FIG. 2*a*), a pilot hole 22 is formed within the workpiece 12. More preferably, the edge 16 defines a chamfer 24 (FIGS. 1-5) that discontinues the cutting edge 16, so that the slug 18 is not completely detached from the remainder 20. As a result, a free body that may become lodged within the tight spaces of the hydroforming fluid pump, workpiece 12 or more concernedly, the final assembly, is not produced. The angle of the chamfer 24 pushes the slug away from the hole 22, as shown in FIG. 2*a*). The hole 22 presents an initial diameter and defines a periphery 26.

Next, the tool 10 presents and the hole 22 is engaged by extruding and expanding sections 28,30 operable to widen the hole 22 to a pre-tapped diameter. It is appreciated by those of ordinary skill in the art that the size of the pilot hole 22 is configured to balance the piercing, extruding, and expanding forces necessary to form and expand the hole 22. That is to say, a pilot hole 22 that is too small will require excessive force to extrude and expand the diameter; while too large of a hole 22 increases the cutting/punching force required. Finally, the preferred piercing section 14 presents a length not less than the thickness, so that the entire hole 22 is formed and supported prior to extruding and expanding.

As shown in FIGS. 1-5, the extruding section 28 is adjacently positioned after the piercing section 14 and configured to push workpiece material away from the surface 12*a* (FIG. 2*b*). As shown in FIGS. 1-5, the expanding section 30 adjacently abuts the extruding section 28 and is configured to gradually encroach upon the periphery 26 of the hole 22, thereby pushing workpiece material radially outward, so as to compress the workpiece and expand the hole 22. As such, the expanding section 30 generally presents a bellowed section, whereat the tool diameter gradually transitions from the pilot hole diameter to an initial pre-tapped diameter. The linearly expanding walls of the preferred section 30 are filleted at the ends of the section 30 to facilitate transition and prevent chipping.

Figure 2F:
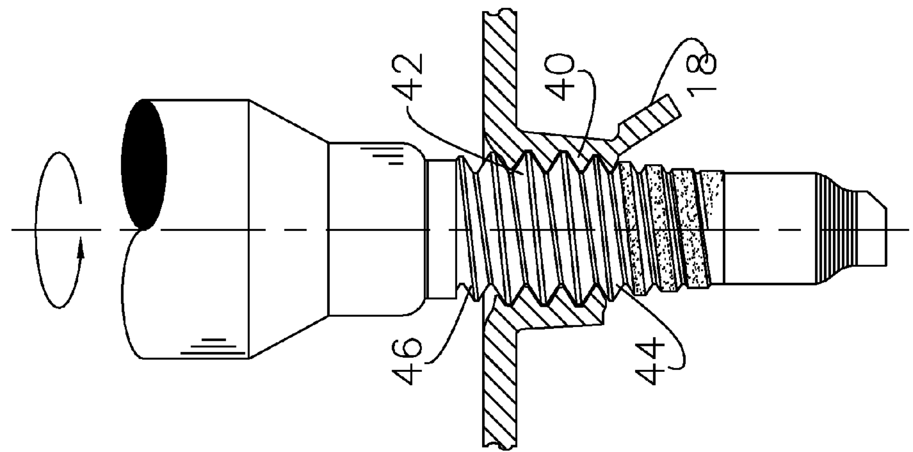
Figure 2E:
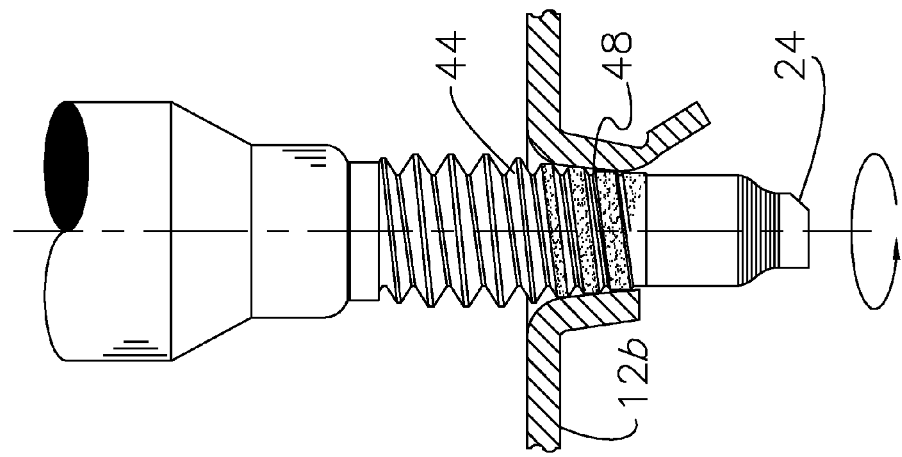
Figure 2D:
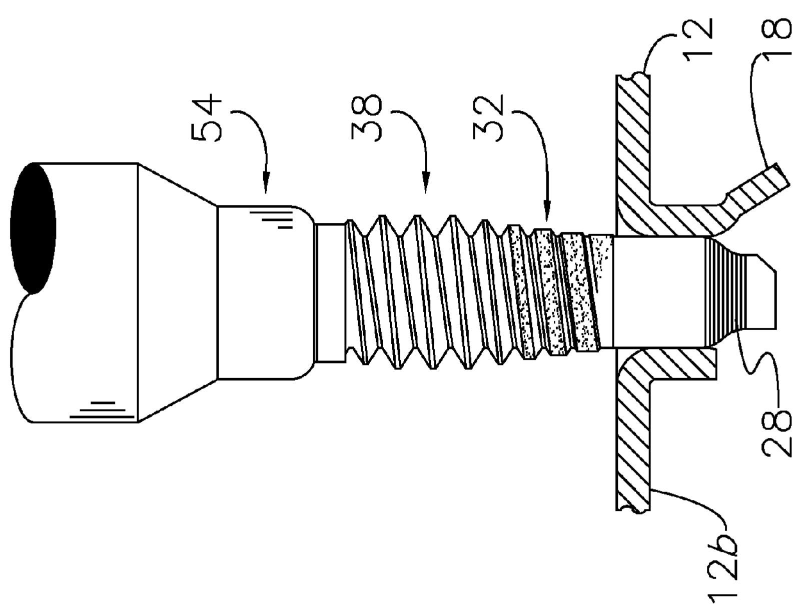
Figure 2G:
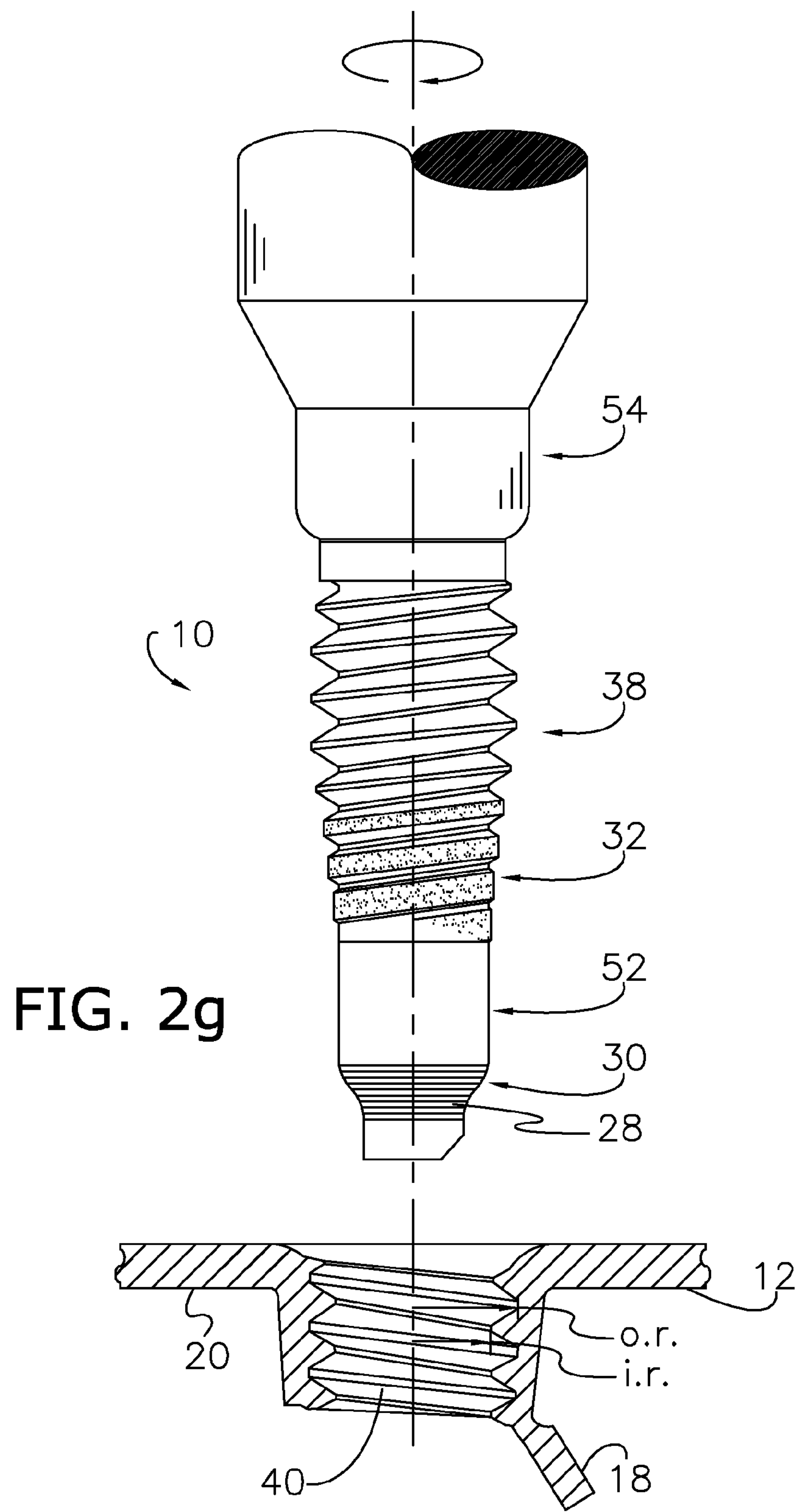

Once extruded and expanded the tool 10 is configured to burnish the periphery 26 of the hole 22; and as such, further presents a burnishing section 32 longitudinally adjacent the expanding section 30 (FIG. 2*e*). The burnishing section 32 is preferably configured to engage, expand, flatten, and polish the periphery prior to tapping. More particularly, as shown in FIG. 1, the burnishing section 32 presents a gradually encroaching engaging surface 34. The surface 34 is defined by a burnishing thread 36 that gradually extends in an outwardly direction from the base to the top of the section 32. The burnishing thread 36 is truncated at an increasingly outward lateral position along the thread radius, so that the engaging surface 34 initially presents, at the base, its largest surface area of engagement and innermost point. The engaging surface 34 is configured to expand the periphery 26 to a radius greater than the minor diameter (or inner radius (i.r.)), and less than the major diameter (or outer diameter (o.r.)), of the proposed tapped thread (FIG. 2*g*), and more preferably the final burnished radius is generally half the distance between the proposed inner and outer radii. As such, the burnishing section 32 in the illustrated embodiment, engages the periphery 26 by being translated towards the workpiece 12, while rotating in a first direction.

Consideration of the preparatory treatment of the periphery includes but is not limited to the roundness, size and finish of the proposed hole, and most specifically to the roundness of the would-be resultant thread. Of secondary importance is the roundness of the minor diameter, which can also be improved by the burnishing process.

Next, the tool 10 presents a tapping section 38 longitudinally adjacent the burnishing section 32 and configured to form a female thread 40 along the periphery of the burnished hole (FIG. 2*f*). As such, the tapping section 38 presents a hardness value greater than that of the workpiece; however, it is appreciated that the process of tapping primarily involves "moving" material inward towards the inner radius and outward towards the outer radius. Thus, a forming male thread 42 spirals along the entire longitudinal length of the section 38, so as to present the desired pitch (i.e., distance between adjacent threads revolutions). It is appreciated that the extrusion process creates a recess on the surface, for insets and the like; however, where recessed fasteners are desired, for example, the thread 42 may be truncated at the top (FIG. 4), so as to further define a shoulder or inset 43.

In the illustrated embodiment, the male thread 42 presents a triangular thread, however, it is also appreciated that other thread configurations, such as a rectangular or trapezoidal thread, could be utilized where greater load capability or accuracy is necessary. The tapping thread 42 preferably includes an initial ramp up 44 and a rear ramp down subsection 46, wherein the thread 42 presents gradually increasing and decreasing outer thread radii respectively (FIGS. 1, 2, and **2*f*). Thus, the tapping section 38 also engages the periphery 26 by being translated relative to the workpiece 12 and rotating in the first direction relative to the hole 22**.

In another aspect of the invention, where the workpiece 12 presents or is caused to present an initial tubular configuration, is placed within a die cavity defined by a die 48, and undergoes a hydroforming process, the preferred tool 10 is further adapted for use during the process. More specifically, it is appreciated that during such a process, the workpiece 12 is filled with a pressurized fluid (not shown) that acts on the interior surface **12*b* of the tubular workpiece 12, so as to cause it to expand (FIG. 2*d*) equally in all directions. The workpiece 12 is conformed to the interior contours of the die 48 as it expands. The tool 10 and die 48 are cooperatively configured to allow the tool 10 to engage the workpiece 12 during or after the hydroforming the process, and as such, the die 48 preferably defines an opening 50 through which the tool 10** is translated.

In this configuration, the preferred tool 10 further presents a sealing section 52 longitudinally intermediate the piercing and tapping sections 14,38, and more preferably intermediate the expanding and burnishing sections 30,32. The sealing section 52 is configured to prevent fluid from leaking through the hole 22 after the process. It is appreciated that the pressurized fluid acts as a mandrel to prevent the tube from collapsing and that sealing the fluid after the hydroforming process allows for additional holes to be pierced without fluid loss and collapsing the entrance to a hole unnecessarily. More particularly, and as shown in FIG. **2*d*, the sealing section 52 is cooperatively configured with the expanded hole, such that the section 52** is tightly received therein.

As shown in FIG. 4, an alternative embodiment of the sealing section 52 presents tapered walls to accommodate expansion by the hole 22 resulting from hydroforming. In this configuration, however, it is appreciated that the rates of expansion and taper must be precisely congruent in order to enable relative travel while maintaining a seal. Alternatively, the rate of taper may exceed the expansion of the hole, so that the sealing section 52 also causes the hole 22 to expand. This enables the expanding section 30 to be eliminated or reduced, as it is appreciated that the taper of the sealing section 52 would perform the same function. In another alternative, the tool 10 may be free to travel with the workpiece 12, thereby necessitating a longitudinal length sufficient only to form the seal. Where the hole does not expand, but rather contracts onto the tool 10 after extrusion and cooling, it is preferable to provide a slight taper that is reverse of the taper illustrated in FIG. 4 (e.g., a back taper of 1°). Finally, the sealing section 52, and especially with respect to the later configuration, may further present an outer layer 53 of compressive material configured to better seal the periphery 26 (FIG. 3).

After the hole 22 has been tapped, the tool 10 is caused to disengage the workpiece 12 by reversing the overall motion of the sections 14,28,30,32,38,52 described above. That is to say, the tapping and burnishing sections 36,38 are rotated in a direction opposite the first, and all of the sections are reversibly translated (i.e., translated diametrically opposite the engaging direction). It is appreciated that in order to enable this motion, the burnishing and tapping sections 36,38 must present congruent threads (e.g., equal pitch, etc.). Moreover, it is appreciated that the male thread 42 must produce a tapped thread 40 defining an inner diameter greater than the maximum diameter defined by the piercing, extruding, expanding and/or sealing sections 14,28,30,52 to enable the removal of the tool 10.

In another aspect of the invention, the tool 10 is preferably connected, and more preferably removably connected to a preferably programmable machine 54 at or near its connecting end (FIGS. 1-5). The machine 54, which may be, for example, a robot arm or other substantial tool actuation device is operable to laterally position, then longitudinally translate and/or rotate the tool 10 to within tolerancing. As previously mentioned, the machine 54 is operable to ensure perpendicular engagement between the tool 10 and workpiece 12, and as such may further include one or more sensors (not shown).

In yet another aspect of the invention, it is also appreciated that the tool 10 may present an integral member (FIGS. 1-4), or an assembly (FIG. 5) constructed from respective sets of piercing, extruding, expansion, sealing, burnishing and tapping subparts (not shown). That is to say, each set presents a plurality of a single type of subpart presenting differing sizes, lengths, surfaces, thread diameters and/or pitches, for example. As shown in FIG. 5, the assembled tool 10 comprises a selected sub-part from each of the sets, as desired, and the selected sub-parts are removably interconnected so as to be interchanged with another selected sub-part from said each of the sets or completely left out. For example, it is appreciated that extruding or expanding the pilot hole 22 may not be necessary to produce a desired tapped hole of congruent average diameter, such that these sections 28,30 may be left out of the tool assembly. The assembly 10 may be securely fastened by a series of male prongs 56 and female receptacles 58 defined by the subparts, and/or a locking key 60 that passes through their longitudinal centers (FIG. 5). The key 60 may be secured to the machine 54, for example, by a bolt and nut fastener 62 (also shown in FIG. 5).

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventors hereby state their intent to rely on the Doctrine of Equivalents to assess the scope of the present invention as pertains to any apparatus, system or method not materially departing from the literal scope of the invention set forth in the following claims.

What is claimed is:

1. A tool adapted to form a tapped hole within a workpiece in a single pass, wherein the workpiece presents a first hardness, thickness, and exterior surface, said tool comprising:

an elongated member presenting a distal end and a longitudinal length greater than the thickness, said member further presenting:

a piercing section adjacent the distal end, defining a cutting edge presenting an edge hardness greater than the first, and configured to cut a slug from a remainder of the workpiece during the pass, so as to produce a pilot hole within the workpiece, wherein said hole presents an initial diameter and defines a periphery;

a tapping section spaced from the distal end, presenting a tapping hardness greater than the first, and having tapping threads configured to form a thread along the periphery during the pass; and a burnishing section longitudinally intermediate the piercing and tapping sections, and configured to engage, expand, and polish the periphery during the pass, the burnishing section haying burnishing threads immediately adjacent to the tapping threads with no unthreaded portion therebetween.

2. The tool as claimed in claim 1, wherein the member further presents an extruding section longitudinally intermediate the piercing and tapping sections, and configured to engage the periphery and push workpiece material away from the surface during the pass.

3. The tool as claimed in claim 1, wherein the member further presents an expanding section longitudinally intermediate the piercing and tapping sections, and configured to expand the diameter of the hole during the pass.

4. The tool as claimed in claim 1, wherein the burnishing section defines a gradually encroaching engaging surface configured to expand the hole and treat the periphery.

5. The tool as claimed in claim 1, wherein the member further presents an extruding section adjacent the piercing section and configured to engage the periphery and push workpiece material away from the surface, an expanding section adjacent the extruding section and configured to expand the diameter of the hole, the burnishing section adjacent to the tapping section.

6. The tool as claimed in claim 1, wherein the tool is further adapted for use during a hydroforming process in which the workpiece is filled with a pressurized fluid, and the member further presents a sealing section longitudinally intermediate the piercing and tapping sections and configured to prevent fluid from leaking through the hole during the process.

7. The tool as claimed in claim 6, wherein the sealing section presents longitudinally tapered walls configured to maintain a sealing relationship with the hole.

8. The tool as claimed in claim 1, wherein the cutting edge is chamfered, such that a portion of the slug remains attached to the remainder.

9. The tool as claimed in claim 1, wherein the tapping section further includes ramp-up and ramp-down sub-sections configured to gradually engage and disengage the tapping section and periphery.

10. The tool as claimed in claim 1, wherein the member further presents a second end opposite the distal end, and configured so as to be removably interconnected to a machine operable to translate and rotate the member.

11. The tool as claimed in claim 1, wherein the workpiece is positioned within a die, exposed to a hydroforming process wherein a pressurized fluid engages the workpiece and is operable to cause the workpiece to travel relative to the tool and conform to the die, and the die and tool are cooperatively configured so as to allow the tool to engage the workpiece during the process.

12. A tool adapted to form a tapped hole within a workpiece in a single pass, wherein the workpiece presents a hardness, thickness, and exterior surface, and undergoes a hydroforming process during the pass, said tool comprising:

an elongated member presenting a distal end and a longitudinal length greater than the thickness, said member further presenting:

a piercing section adjacent the distal end, defining a cutting edge, and configured to cut a slug from a remainder of the workpiece during the pass, so as to produce a pilot hole within the workpiece, wherein said hole presents an initial diameter and defines a periphery;

an extruding section longitudinally adjacent the piercing section, and configured to engage the periphery, so as to push workpiece material away from the surface during the pass;

an expanding section longitudinally adjacent the extruding section, and configured to expand the diameter of the hole during the pass;

a sealing section longitudinally adjacent the expanding section, and configured to engage the periphery and prevent fluid from leaking through the hole during the process;

a burnishing section longitudinally adjacent the sealing section, and configured to further expand the diameter and polish the periphery during the pass, the burnishing section having burnishing threads; and a tapping section spaced from the distal end and having tapping threads configured to form a thread along the periphery during the pass, the tapping threads immediately adiacent to the burnishing threads defining continuous threading of the member along the burnishing and tapping sections.

13. The tool as claimed in claim 12, wherein the member presents an assembly constructed from respective sets of piercing, extruding, expanding, sealing, burnishing and tapping subparts, each set contains a plurality of subparts having differing dimensions, and the member comprises a selected subpart from each of the sets, and the selected subparts are removably interconnected so as to be interchanged with another selected subpart from said each of the sets.

14. A method of producing a tapped hole within a workpiece in a single pass, wherein the workpiece presents an exterior surface and defines a thickness, said method comprising the steps of:

engaging the surface with a piercing element defining a continuous cutting edge and translating the edge towards the workpiece a distance greater than the thickness, so as to cut a slug from a remainder of the workpiece and form a pilot hole within the workpiece, wherein said hole defines a periphery, to initiate the pass;

burnishing and expanding the hole with a burnishing element having burnishing threads by translating, while rotating in a first direction the burnishing element;

engaging the periphery with a tapping element immediately adiacent to the burnishing threads and translating, while rotating in the first direction, the tapping element a distance greater than the thickness of the workpiece, the tapping element having tapping threads so as to form a female thread along the periphery of the hole, during the pass;

disengaging the tapping element from the hole by reversibly translating the tapping element a distance greater than the thickness, while rotating in a direction opposite the first, during the pass;

disengaging the hole by reversibly translating, while rotating in the direction opposite the first, the burnishing element after forming the thread; and disengaging the piercing element from the hole by reversibly translating the piercing element a distance greater than the thickness, to complete the pass.

15. The method as claimed in claim 14, wherein the method further comprises engaging the periphery with an expanding element and expanding the hole by translating the expanding element, engaging the periphery with an extruding element and moving workpiece material away from the surface by translating the extruding element, engaging the hole with a sealing element , so as to seal the hole prior to forming the thread, and disengaging the hole by reversibly translating the expanding, extruding, and sealing elements.

16. The method as claimed in claim 15, wherein the piercing, expanding, extruding and sealing elements present a maximum diameter, and the thread presents a minimum hole diameter greater than the maximum diameter.

17. The method as claimed in claim 15, wherein the piercing, expanding, extruding, sealing, burnishing, and tapping elements present sections of an integral member, and the method further comprises securing the member in a predetermined position relative to the workpiece.

* * * * *